(12) United States Patent
Watson, III et al.

(10) Patent No.: US 11,620,443 B2
(45) Date of Patent: Apr. 4, 2023

(54) FILE CAPTURE AND PROCESSING SYSTEM WITH IN-LINE ERROR DETECTION

(71) Applicant: BANK OF AMERICA CORPORATION, Charlotte, NC (US)

(72) Inventors: Verlon Safold Watson, III, Charlotte, NC (US); Coty Tyler Cherrix, Atlanta, GA (US); Adam Nathaniel Desautels, Charlotte, NC (US); Brigitte Marie Doughty, Charlotte, NC (US); Charles Christopher Harbinson, Mooresville, NC (US); Letishia Renee Hunt, Charlotte, NC (US); Kyaw Htet Kyi, Charlotte, NC (US); Collin Jarel Cacho Lenon, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 195 days.

(21) Appl. No.: 16/751,530

(22) Filed: Jan. 24, 2020

(65) Prior Publication Data

US 2021/0232839 A1 Jul. 29, 2021

(51) Int. Cl.
*G06F 40/174* (2020.01)
*H04L 67/06* (2022.01)
(Continued)

(52) U.S. Cl.
CPC ........ *G06F 40/174* (2020.01); *G06F 11/0772* (2013.01); *G06F 11/326* (2013.01);
(Continued)

(58) Field of Classification Search
CPC ............... G06K 9/033; G06K 9/00456; G06K 9/00483; G06K 9/00449; G06K 9/2063;
(Continued)

(56) References Cited

U.S. PATENT DOCUMENTS

| 6,535,855 B1* | 3/2003 | Cahill | G06Q 20/00 |
| | | | 705/346 |
| 7,539,646 B2 | 5/2009 | Gilder et al. | |

(Continued)

OTHER PUBLICATIONS

What is Double Feed detection (and how do I enable it)?; Feb. 25, 2019; Canon.com; pp. 1-4.*
(Continued)

*Primary Examiner* — Andrew R Dyer
(74) *Attorney, Agent, or Firm* — Moore & Van Allen PLLC; R. W. McCord Rayburn (57) ABSTRACT

A system is provided for file capture and in-line error correction. The system comprises: a controller configured to capture and process a file during a file capture sequence comprising one or more capture events, the controller being configured to: capture a file using a file capture device associated with a user device, wherein capturing the file comprises receiving a file image and a user input data field associated with the file; identify, using an in-line file analysis module, an error with a capture event during the file capture sequence, wherein the error is a discrepancy identified between the user input data field and an image-derived data field; correct the error in the file before the file capture sequence is completed and the file is exported; and export the file, wherein the file capture sequence is completed.

19 Claims, 7 Drawing Sheets

(51) Int. Cl.
| | |
|---|---|
| *G06F 40/106* | (2020.01) |
| *G06F 40/166* | (2020.01) |
| *G06F 11/07* | (2006.01) |
| *G06F 11/32* | (2006.01) |
| *G06F 16/93* | (2019.01) |
| *G06V 30/412* | (2022.01) |
| *G06V 30/413* | (2022.01) |
| *G06V 30/418* | (2022.01) |
| *G06V 30/12* | (2022.01) |
| *G06V 30/10* | (2022.01) |

(52) U.S. Cl.
CPC ............ *G06F 16/93* (2019.01); *G06F 40/106* (2020.01); *G06F 40/166* (2020.01); *G06V 30/12* (2022.01); *G06V 30/412* (2022.01); *G06V 30/413* (2022.01); *G06V 30/418* (2022.01); *H04L 67/06* (2013.01); *G06V 30/10* (2022.01)

(58) Field of Classification Search
CPC ..... H04L 67/06; H04L 43/0823; H04L 67/52; H04L 67/1095; H04L 67/1097; G06F 40/106; G06F 40/166; G06F 11/0772; G06F 11/326; G06F 16/93; G06F 40/174; G06F 40/226; G06F 11/327; G06V 10/987; G06V 30/10; G06V 30/12; G06V 30/412; G06V 30/413; G06V 30/418
USPC ........................................................ 382/311
See application file for complete search history.

(56) References Cited

U.S. PATENT DOCUMENTS

| | | | |
|---|---|---|---|
| 8,351,677 B1 | 1/2013 | Oakes, III et al. | |
| 9,639,750 B2* | 5/2017 | Smith | G06K 9/00469 |
| 9,779,392 B1* | 10/2017 | Prasad | G06Q 40/02 |
| 10,380,559 B1* | 8/2019 | Oakes, III | G06Q 20/042 |
| 10,452,784 B1* | 10/2019 | Walters | G06V 10/82 |
| 10,504,185 B1* | 12/2019 | Buentello | G06Q 40/06 |
| 10,521,781 B1* | 12/2019 | Singfield | G06K 9/00335 |
| 11,030,752 B1* | 6/2021 | Backlund | G06T 7/0002 |
| 11,216,884 B1* | 1/2022 | Buentello | G06Q 40/06 |
| 2005/0127160 A1* | 6/2005 | Fujikawa | G06Q 20/042 |
| | | | 235/379 |
| 2006/0219773 A1* | 10/2006 | Richardson | G07F 19/00 |
| | | | 235/379 |
| 2008/0071575 A1* | 3/2008 | Climax | H04L 67/1097 |
| | | | 705/2 |
| 2009/0076951 A1* | 3/2009 | Szamel | G06Q 40/02 |
| | | | 705/39 |
| 2010/0082470 A1 | 4/2010 | Walach et al. | |
| 2012/0330842 A1* | 12/2012 | Heit | G06F 16/113 |
| | | | 705/45 |
| 2013/0103582 A1 | 4/2013 | Singfield | |
| 2014/0317049 A1* | 10/2014 | De | G06F 16/93 |
| | | | 707/608 |
| 2015/0199322 A1* | 7/2015 | Kim | G06F 40/169 |
| | | | 715/256 |
| 2017/0318164 A1* | 11/2017 | Ohmi | G06K 9/00442 |
| 2018/0204111 A1* | 7/2018 | Zadeh | G06N 3/0436 |
| 2018/0268015 A1* | 9/2018 | Sugaberry | G06N 5/003 |
| 2019/0333402 A1* | 10/2019 | Kim | G06F 3/04883 |
| 2020/0372105 A1* | 11/2020 | Gerges | G06F 40/232 |
| 2021/0084142 A1* | 3/2021 | Nguyen | H04M 1/663 |

OTHER PUBLICATIONS

Underwood et al.; Basic OCR correction; usesofscale.com; pp. 1-3.*
How to Deposit Checks With the Bank of America iPhone App; Feb. 1, 2017; wikihow.com; pp. 1-3.*
Aaron Teague; 8 Benefits of Document Imaging & Optical Character Recognition for HR; May 9, 2019; ascendsoftware.com; pp. 1-6.*
Classification Definitions Class 715, Data Processing: Presentation Processing of Document, Operator Interface Processing, and Screen Saver Display Processing; Feb. 2011; p. 2.*
"Strikethrough;" Microsoft Computer Dictionary; 2002; Microsoft Corporation; Fifth Edition; p. 500.*

* cited by examiner

FILE CAPTURE AND PROCESSING SYSTEM WITH IN-LINE ERROR DETECTION

BACKGROUND

Discrepancies between recorded data and actual values in captured files or documents can cause inconvenience and delays. Current methods typically rely on operational analysts to manually resolve errors in files after they have already been processed and flagged. Furthermore, these conventional processes cannot resolve errors in near real-time during an image capture sequence, instead taking days or longer to fully correct the files. Therefore, there exists a need for an improved system for capturing and processing files while efficiently resolving identified errors.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for file capture and in-line error correction. The system comprises: a controller configured to capture and process a file during a file capture sequence comprising one or more capture events, the controller comprising a memory device with computer-readable program code stored thereon, a communication device connected to a network, and a processing device, wherein the processing device is configured to execute the computer-readable program code to: capture a file using a file capture device associated with a user device, wherein capturing the file comprises receiving a file image and a user input data field associated with the file; identify, using an in-line file analysis module, an error with a capture event during the file capture sequence, wherein the error is a discrepancy identified between the user input data field and an image-derived data field; correct the error in the file before the file capture sequence is completed and the file is exported; and export the file, wherein the file capture sequence is completed.

In one specific embodiment, the processing device is further configured to execute the computer-readable program code to remove the file from the file capture sequence for a predetermined amount of time in response to identifying the error.

In another embodiment, the processing device is further configured to execute the computer-readable program code to: generate an actionable notification based on identifying the error; transmit the actionable notification to the user device, wherein the actionable notification prompts the user device to confirm the error; receive a response from the user device confirming the error; and in response to receiving the response, correct the error. In yet another embodiment, the processing device is further configured to execute the computer-readable program code to transmit the file to a resolution analyst device based on not receiving the response from the user device within a predetermined amount of time.

In yet another embodiment, the file is a physical document and the file capture device is an image capture device.

In yet another embodiment, the controller further comprises an optical character recognition module configured to determine the image-derived data field, and wherein the error is a discrepancy of one or more characters between the user input data field and the image-derived data field.

In yet another embodiment, the user input data field and the image-derived data field as associated with the same data field.

In yet another embodiment, correcting the error comprises modifying the file to rectify the error, wherein the processing device is further configured to modify at least one of the file image and the user input data field. In yet another embodiment, correcting the error comprises recapturing the file after identifying the error.

In yet another embodiment, the file is a resource vehicle, and wherein exporting the file comprises routing resources associated with the resource vehicle to a resource storage location.

A computer-implemented method for file capture and in-line error correction is also provided. The computer-implemented method comprises: providing a controller configured to capture and process a file during a file capture sequence comprising one or more capture events, the controller comprising a memory device with computer-readable program code stored thereon, a communication device connected to a network, and a processing device, wherein the processing device is configured to execute the computer-readable program code to: capture a file using a file capture device associated with a user device, wherein capturing the file comprises receiving a file image and a user input data field associated with the file; identify, using an in-line file analysis module, an error with a capture event during the file capture sequence, wherein the error is a discrepancy identified between the user input data field and an image-derived data field; correct the error in the file before the file capture sequence is completed and the file is exported; and export the file, wherein the file capture sequence is completed.

In one specific embodiment, the processing device is further configured to execute the computer-readable program code to remove the file from the file capture sequence for a predetermined amount of time in response to identifying the error.

In another embodiment, the processing device is further configured to execute the computer-readable program code to: generate an actionable notification based on identifying the error; transmit the actionable notification to the user device, wherein the actionable notification prompts the user device to confirm the error; receive a response from the user device confirming the error; and in response to receiving the response, correct the error. In yet another embodiment, the processing device is further configured to execute the computer-readable program code to transmit the file to a resolution analyst device based on not receiving the response from the user device within a predetermined amount of time.

In yet another embodiment, the controller further comprises an optical character recognition module configured to determine the image-derived data field, and wherein the error is a discrepancy of one or more characters between the user input data field and the image-derived data field.

In yet another embodiment, correcting the error comprises modifying the file to rectify the error, wherein the processing device is further configured to modify at least one of the file image and the user input data field.

In yet another embodiment, correcting the error comprises recapturing the file after identifying the error.

A computer program product for file capture and in-line error correction is also provided. The computer program product comprises a non-transitory computer-readable medium comprising computer-readable instructions, the computer-readable instructions, when executed by a processing device, cause the processing device to: capture a file using a file capture device associated with a user device, wherein capturing the file comprises receiving a file image and a user input data field associated with the file; identify, using an in-line file analysis module, an error with a capture event during a file capture sequence, wherein the error is a discrepancy identified between the user input data field and an image-derived data field; correct the error in the file before the file capture sequence is completed and the file is exported; and export the file, wherein the file capture sequence is completed.

In one specific embodiment, the computer-readable instructions, when executed by the processing device, further cause the processing device to remove the file from the file capture sequence for a predetermined amount of time in response to identifying the error.

In another embodiment, the computer-readable instructions, when executed by the processing device, further cause the processing device to: generate an actionable notification based on identifying the error; transmit the actionable notification to the user device, wherein the actionable notification prompts the user device to confirm the error; receive a response from the user device confirming the error; and in response to receiving the response, correct the error.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the system, as described herein leverage artificial intelligence and other complex, specific-use computer systems to provide a novel approach for capturing and processing files with novel in-line error detection. The system is configured to capture and process files, such as document image files, while monitoring the captured files for potential discrepancies or errors. The system compares user input data for fields associated with the captured files to the same data fields as derived by the system itself through image processing technology such as optical character recognition. In response to detecting an error, the system is configured to interrupt a typical sequence of events associated with a conventional file capture and processing systems and instead rectify an identified error in near real-time. The system is configured to temporarily remove an error-associated file from processing before it can be completed and correct the error before reinserting the corrected file back into the processing stream. Conversely, current methods solely rely on operational analysts to manually resolve errors in files after they have already been processed and flagged. Furthermore, these conventional processes cannot resolve errors in near real-time during an image capture sequence, instead taking days or longer to fully correct the files.

The present invention further interrupts the conventional operation of file capture and processing systems by inserting a user interaction-driven error correction into the file processing sequence. In this way, interaction with a user device is reinserted into the process thereby enabling the near real-time error correction. Furthermore, duplicate file image examining systems are repurposed, wherein the systems are enlisted to employ character recognition technology to identify discrepancies in received files. As such, the present invention provides an improvement to typical file capture and processing systems and technology.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the file capture and processing system. In some embodiments, a user may be a computing device user, a phone user, a mobile device application user, a customer of an entity or business, a system operator, and/or employee of an entity (e.g., a financial institution). In one embodiment, a user may be a customer accessing a user account via an associated user device, wherein files and/or data from an interaction between the user and an entity is analyzed or processed by the system. In a specific embodiment, a user is an account user transferring or submitting a file, such as document. In another specific embodiment, the file is an image file of a physical document such as a check, wherein the system is configured to process the image file to route a transfer of resources between resource locations (e.g., accounts) for an amount of resources specified by the captured document. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, global positioning system (GPS) devices, entertainment devices, or any combination of the aforementioned. The device may be used by the user to access the system directly or through an application, online portal, internet browser, virtual private network, or other connection channel. In a specific embodiment, a user device may refer to an automated teller machine (ATM) configured to receive and process a record such as a check. In another specific embodiment, the user device is a mobile device (e.g., a smart phone) associated with a user and configured with an image capture device for capturing a file.

As used herein, the term "entity" may be used to include any organization or collection of users that may interact with the file capture and processing system. An entity may refer to a business, company, or other organization that either maintains or operates the system or requests use and accesses the system. In a specific embodiment, the entity may be a cybersecurity entity or misappropriation prevention entity. In one embodiment, the entity may be a financial entity. The terms "financial institution" and "financial entity" may be used to include any organization that processes financial transactions including, but not limited to, banks, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In another specific embodiment, monitoring may comprise determining a match between user input data fields and system-derived data fields (i.e., error detection).

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views and/or transfers, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity.

Figure 1:
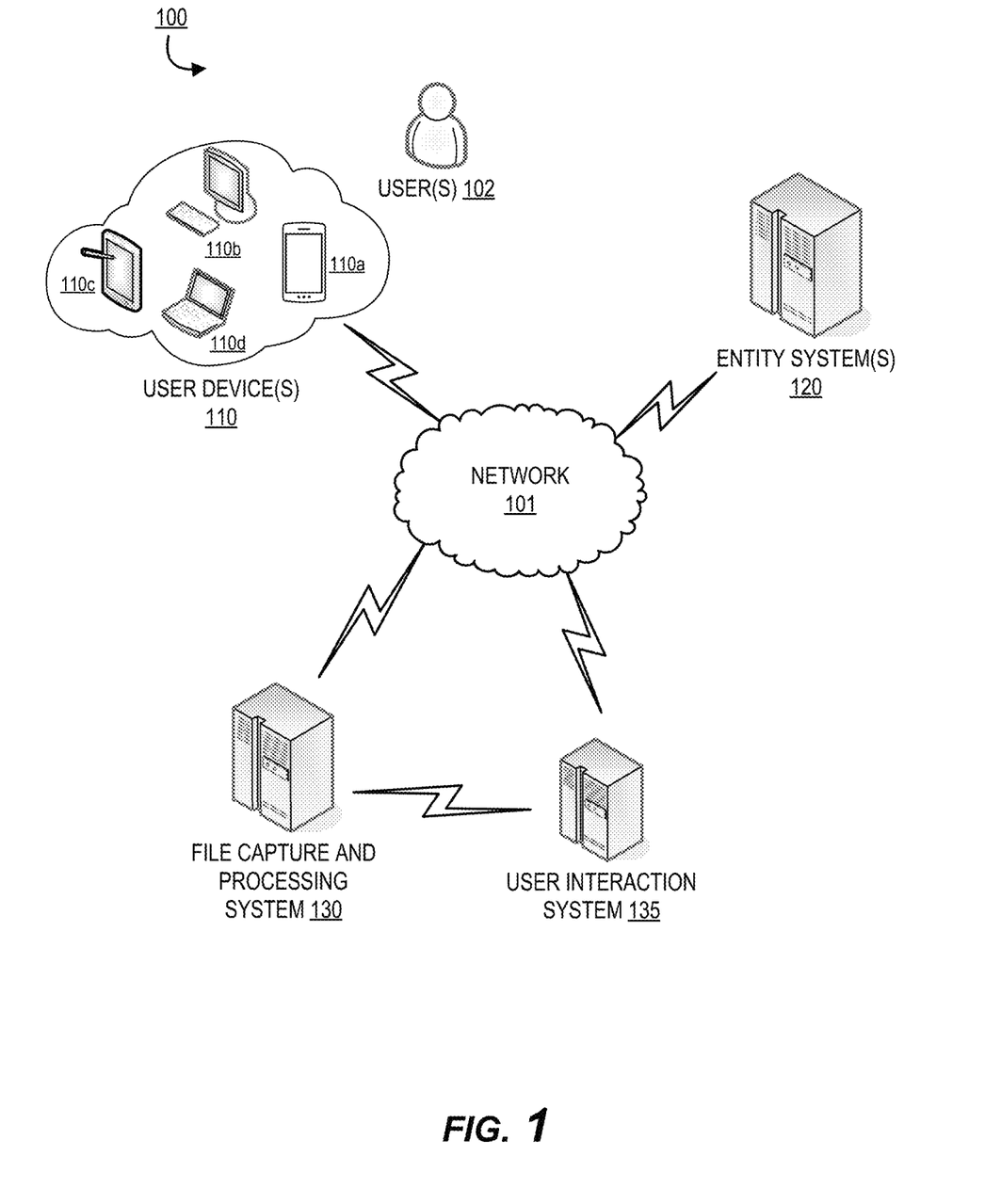
FIG. 1 provides a file capture and processing system environment, in accordance with one embodiment of the invention.

FIG. 1 provides a file capture and processing system environment 100, in accordance with one embodiment of the invention. As illustrated in FIG. 1, file capture and processing system 130 is operatively coupled, via a network 101, to the user device(s) 110 (e.g., a plurality of user devices 110a-110d) and the entity system(s) 120. In this way, the file capture and processing system 130 can send information to and receive information from the user device 110 and the entity system 120. In the illustrated embodiment, the plurality of user devices 110a-110d provide a plurality of communication channels through which the entity system 120 and/or the file capture and processing system 130 may communicate with the user 102 over the network 101.

In the illustrated embodiment, the file capture and processing system 130 further comprises a user interaction system 135 which may be separate systems operating together with the file capture and processing system 130 or integrated within the file capture and processing system 130. In some embodiments, the user interaction system 135 further includes an artificial intelligence (AI) system such as an AI assistant configured to interact with the user and bridge communications between the file capture and processing system 130 and the user device 110.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120 via a user device 110 while a data flow between the user device 110 and the entity system 120 is intercepted and monitored by the file capture and processing system 130 over the network 101. In some embodiments a user 102 is a user requesting service from the entity or interacting with an account maintained by the entity system 120. In an alternative embodiment, the user 102 is an individual interacting with the file capture and processing system 130 over the network 101 and monitoring input of information from the entity systems 120 to the file capture and processing system 130 for processing and analysis (e.g., an employee of the entity operating and/or monitoring the systems 120, 130).

Figure 2:
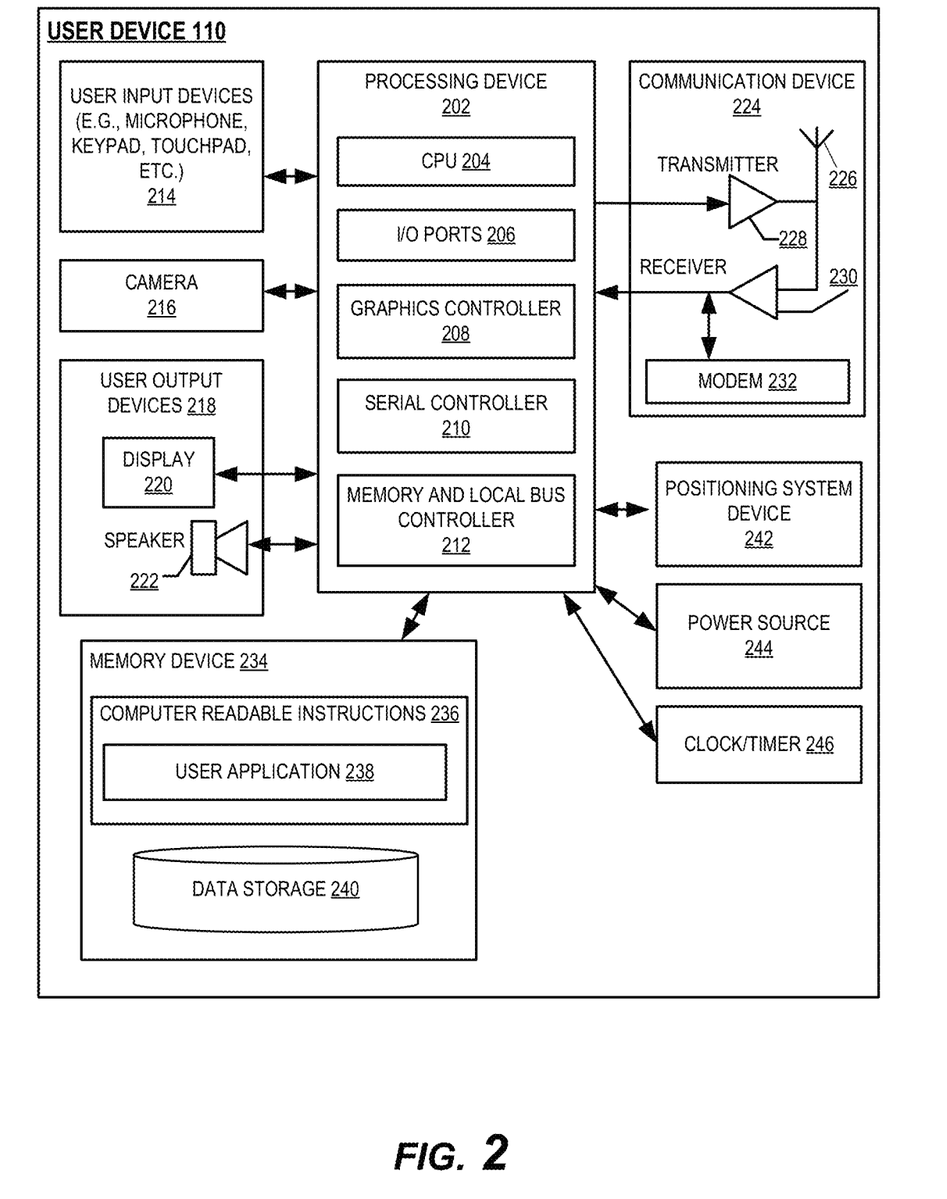
FIG. 2 provides a block diagram of a user device, in accordance with one embodiment of the invention.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. In one embodiment, the camera 216 may include a scanner, barcode reader, or any other image capturing device configured to capture an image or collect data from a hardcopy record or document. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user is a customer of a financial entity and the user application 238 is a resource management application providing access to a resource storage location maintained by the entity system 120 wherein the user may interact with the resource storage location via a user interface of the user application 238. In one embodiment, the user application 238 may be configured to allow a user 102 to request, access, transfer, capture, and/or view files on the user device 110, wherein the files are provided and displayed to the user 102 on the user device 110. In one embodiment, the user application 238 comprises an AI assistant application configured to bridge communication between the file capture and processing system 130 and the user device 110 as discussed herein.

The processing device 202 may be configured to use the communication device 224 to communicate with one or more other devices on a network 101 such as, but not limited to the entity system 120 and the file capture and processing system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Figure 3:
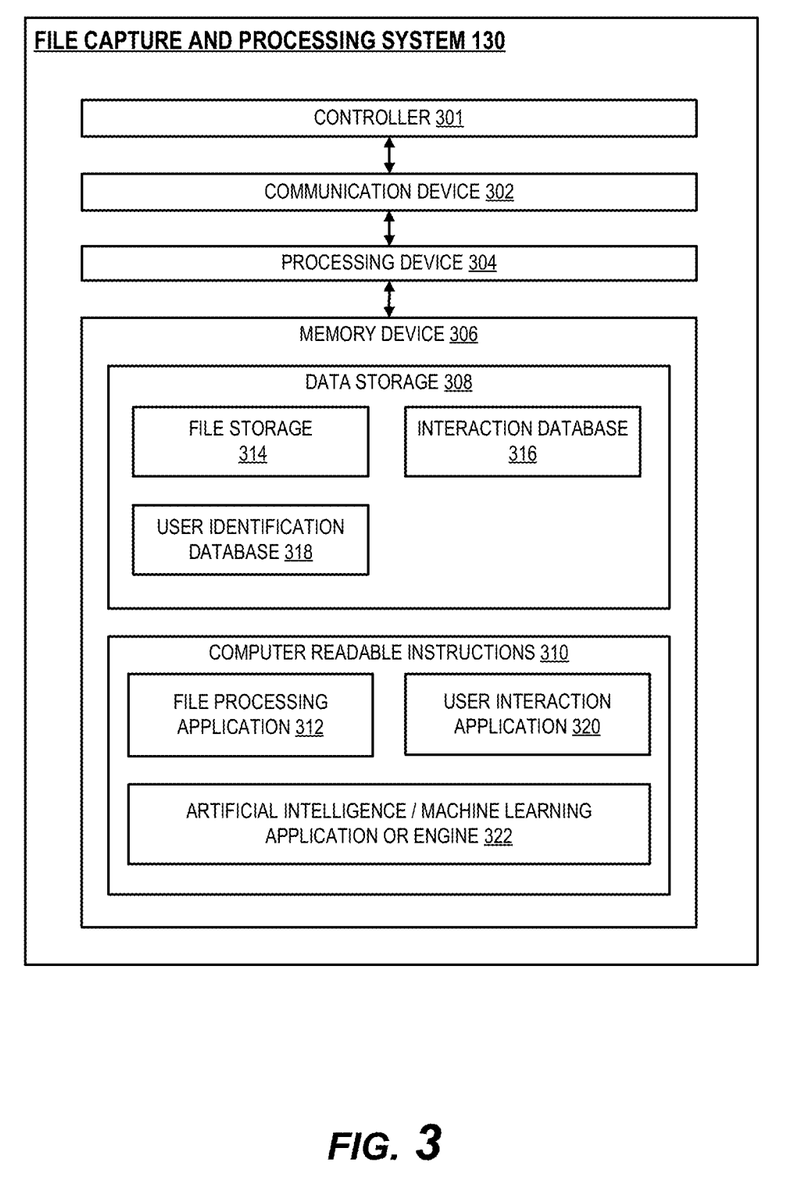
FIG. 3 provides a block diagram of a file capture and processing system, in accordance with one embodiment of the invention.

FIG. 3 provides a block diagram of a file capture and processing system 130, in accordance with one embodiment of the invention. The file capture and processing system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the file capture and processing system 130, in order to interface and manage data flow between systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the file capture and processing system 130 comprises computer-readable instructions 310 stored in the memory device 306, which in one embodiment includes the computer-readable instructions 310 of a file processing application 312, a user interaction application 320, and an artificial intelligence application 322. The file processing application 312 is configured to capture and process a received file while simultaneously being configured to identify and correct errors identified in the file capture sequence associated with one or more capture events. In one embodiment, the file processing application 312 is configured to verify, process, and route captured resource transfer vehicles (e.g., checks). As previously discussed, the user application 320 and, optionally, the artificial intelligence application 322 are configured to bridge communication between the system 130 and application 312 and the user device to enable near-real time communication and error resolution during a file capture sequence.

In some embodiments, the memory device 306 includes data storage 308 for storing data related to the system environment, but not limited to data created and/or used by the file processing application 312, user interaction application 320, and the artificial intelligence application 322. Data stored in the data storage 308 may comprise file storage 314, an interaction database 316, and a user identification database 318.

File storage 314 is used to store files, files images, and data used by the systems described herein. In some embodiments, the files may include electronic records such as files, data, images, and the like. In a specific example, the electronic records may include stored images of deposited checks captured by the system. While the file storage 314 is shown in FIG. 3 as part of the file capture and processing system 130, in other embodiments, file storage may be included on one or more other systems (e.g., entity systems 120) to supplement or as an alternative to file storage 314 on the file capture and processing system 130. In one embodiment, files are stored on the entity systems 120, wherein the file capture and processing system 130 pulls the files from the entity systems 120. The file capture and processing system 130 may intercept and modify a file captured by a user device 110 before the file is ultimately sent to and/or routed by an entity system 120.

The interaction database 316 is used to store information regarding past interactions (e.g., account actions or events, transactions, communications, inputs, file captures) during a session (e.g., an online banking session) with the user 102. In some embodiments, the interaction database 316 may be configured to store data from an incoming data stream in real-time. The interaction database 316 may further include information or data related to the interactions such as user data, files captures, file corrections, and the like. The system may be configured to access and update stored information and data stored in the interaction database 316 as additional information is collected.

In one embodiment of the invention, the file capture and processing system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the file capture and processing system 130 may include multiple systems, servers, computers or the like maintained by one or many entities. In some embodiments, the file capture and processing system 130 may be part of the entity systems 120. In other embodiments, the entity systems 120 are distinct from the file capture and processing system 130. The file capture and processing system 130 may communicate with the entity systems 120 via a secure connection generated for secure encrypted communications between the two systems either over the network 101 or alternative to the network 101.

Figure 4:
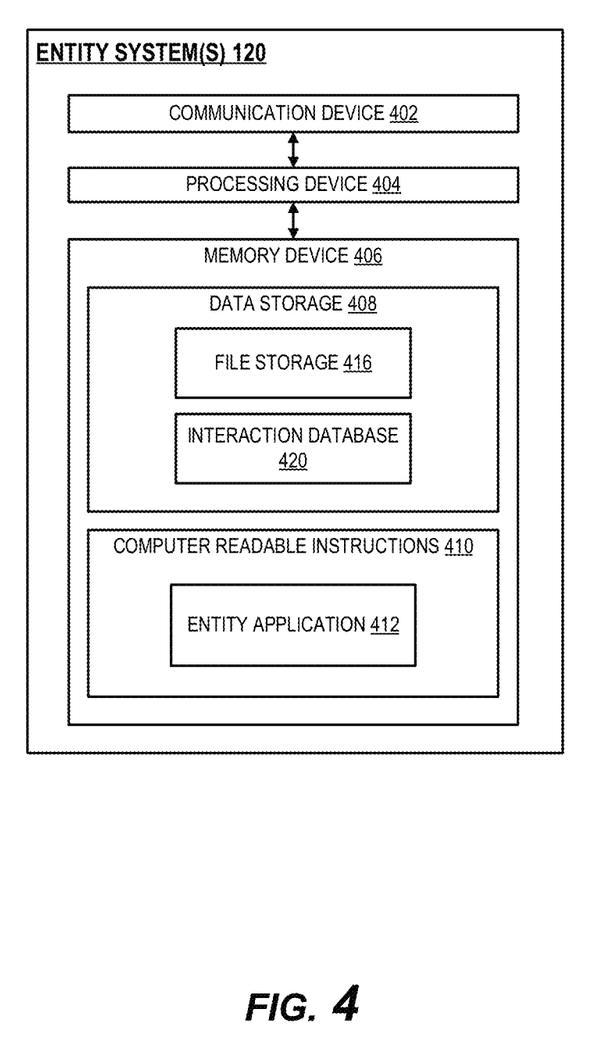
FIG. 4 provides a block diagram of an entity system, in accordance with one embodiment of the invention.

As illustrated in detail in FIG. 4, the environment 100 further includes one or more entity systems 120 which are connected to the user device 110 and the file capture and processing system 130. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the file capture and processing system 130 to provide access to files and accounts stored and maintained on the entity systems 120. In some embodiments, the entity system 120 may communicate with the file capture and processing system 130 during an interaction with a user 102 in real-time, wherein user interactions may be monitored and processed by the file capture and processing system 130. In some embodiments, data storage 408 comprises record or file storage 416 and/or interaction database 420 to either supplement or replace the file storage 314 and/or interaction database 316 of the file capture and processing system 130 as previously discussed.

The systems of the environment 100 are used to capture and process files while simultaneously identifying and correcting errors in said files. As previously discussed, the system is configured to identify errors in received file images through image and character recognition technology. In response to detecting an error, the system is further configured to remove a file from a file capture or processing sequence thereby temporarily sequestering the file for correction in near real-time. The system determines a correction and verifies the correction with a user device via an actionable notification. A corrected file may then be reinserted into the processing flow.

Figure 5:
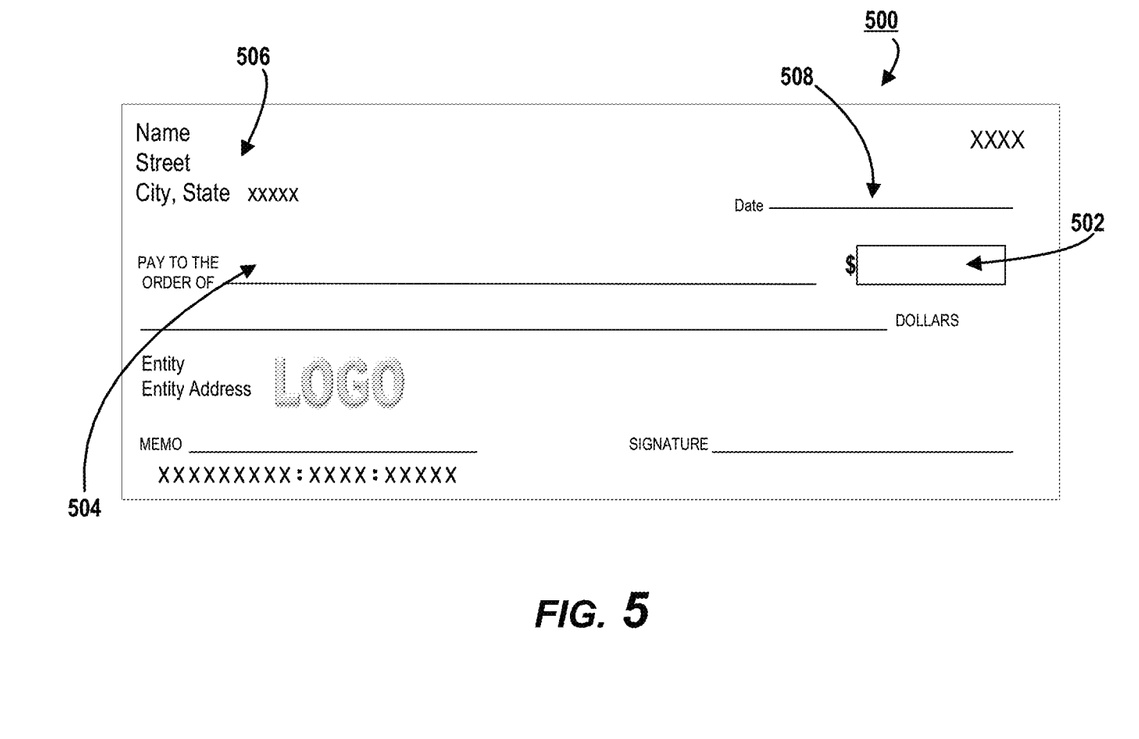
FIG. 5 provides an illustration of a captured file image, in accordance with one embodiment of the invention.

"Files," as used herein, may refer to any form of physical document or data stored captured or collected by the system for processing. In one embodiment, a file or record may include an image of a physical record such as a captured electronic image of a physical document. Physical documents, such as a receipt, a check, a signature page, or the like may be captured by an image capture device associated with the system to generate an image of the document for electronic processing. In other embodiments, a file may be an electronic record such as an electronic file, recording, image, or other form of electronic information that may be stored. FIG. 5 provides an illustration of a captured file image, in accordance with a specific embodiment of the invention, wherein the file is a resource transfer vehicle, and more specifically, a check.

Figure 6:
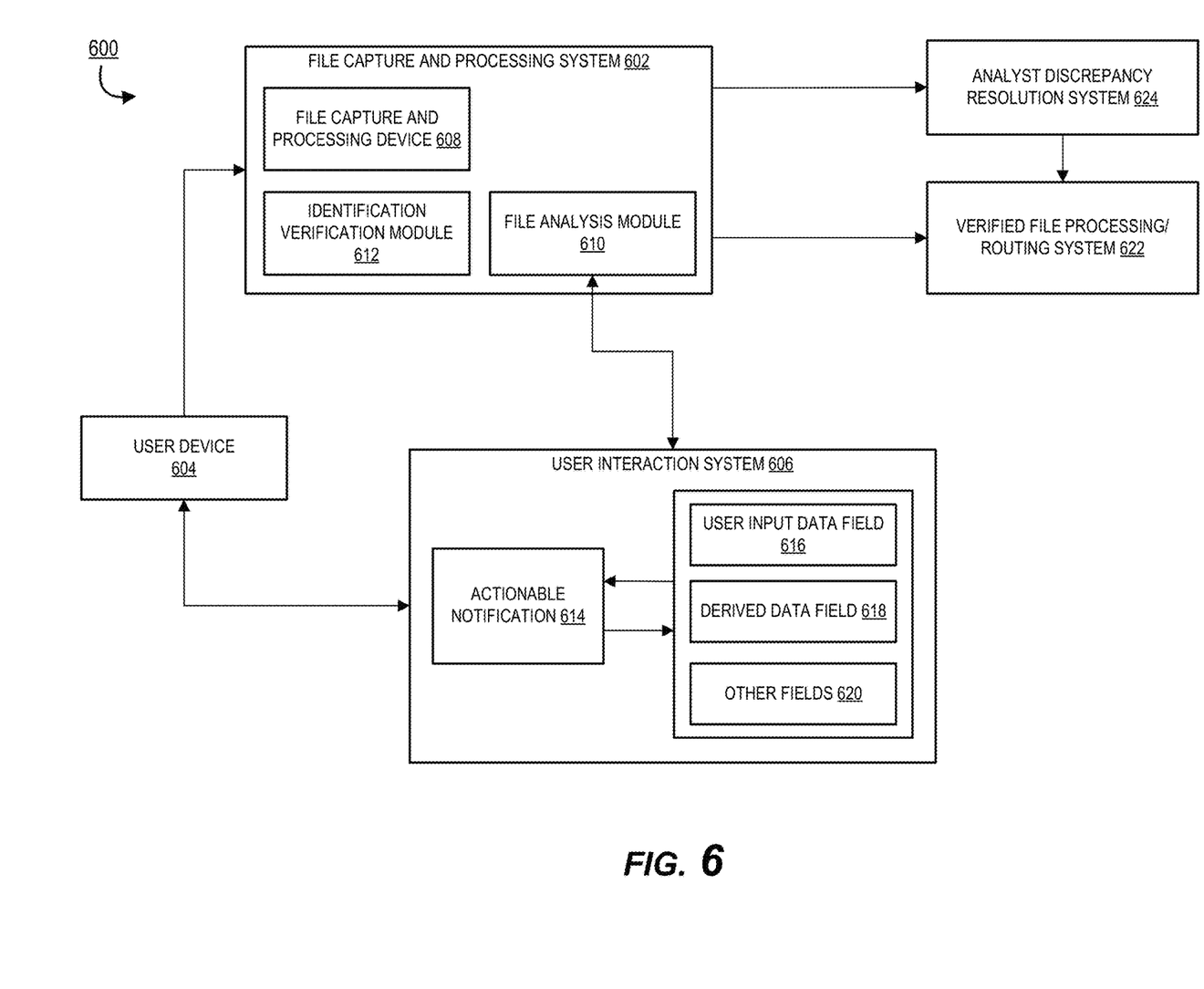
FIG. 6 provides a block diagram of a file capture and processing system environment, in accordance with one embodiment of the invention.

FIG. 6 provides a block diagram of a file capture and processing system environment, in accordance with one embodiment of the invention. The system environment 600 generally comprises a file capture and processing system 602 in communication with a user device 604, and a user interaction system 606 as well as a verified file processing or routing system 622 and an analyst discrepancy resolution system 624. In some embodiments, the file capture and processing system 602, the user device 604, and the user interaction system 608 are the same or similar systems as described with respect to FIG. 1. In operation, a file is first captured from the user device 604 using an image capture device, scanner, or the like. As previously discussed, the file may be a document, or more specifically a check. In the depicted embodiment, the file capture and processing system comprises a capture and processing device 608 which may comprise the image capture device and be configured to process a captured file. As used herein, processing a file may comprise receiving, reading, and/or routing the file. In some embodiments, the system 602 comprises an optical character recognition module (OCR) for reading and analyzing the data contained in the file (e.g., numbers, letters, etc.). In some embodiments, the file capture and processing system 602 comprises an identification verification module 612 configured for authenticating an identity of a user and/or user device from which a file is captured, received, or otherwise obtained in order to prevent potential misappropriation.

The file analysis module 610 is configured to analyze captured files and data read by the file capture and processing device 608 to identify errors and/or mismatches between user-provided data fields and system-derived data fields (e.g., via OCR). Typically, the file analysis module 610 is only used to determine duplicate files by matching data in said files to one another. That said, the system leverages the file analysis module 610 in a non-conventional way to instead determine mismatches or discrepancies between documents and determine errors. In response to identifying a potential error, the file analysis module 610 communicates with the user interaction system 606 to generate an actionable notification 614 to confirm a user input discrepancy with the user device 604. For example, the actionable notification 614 may comprise one or more of a user input data field, a system-derived data field 618, and/or other data 620 which is presented to the user device 604. A response received from the user device (e.g., error confirmation and correction) is transmitted back through the user interaction system 606 to the file analysis module 610.

The file capture and processing system 602 is further in communication with a verified file processing and routing system 622 which is configured to route a file (e.g., a check image) to a destination resource location once the file has been verified being correct. Alternatively, if an error is identified and not resolved via the file analysis module 610, user device 604, and user interaction system 606 (e.g., no response from user device), the file may be instead transmitted to an analyst discrepancy resolution system 624 for typical error correction.

Figure 7:
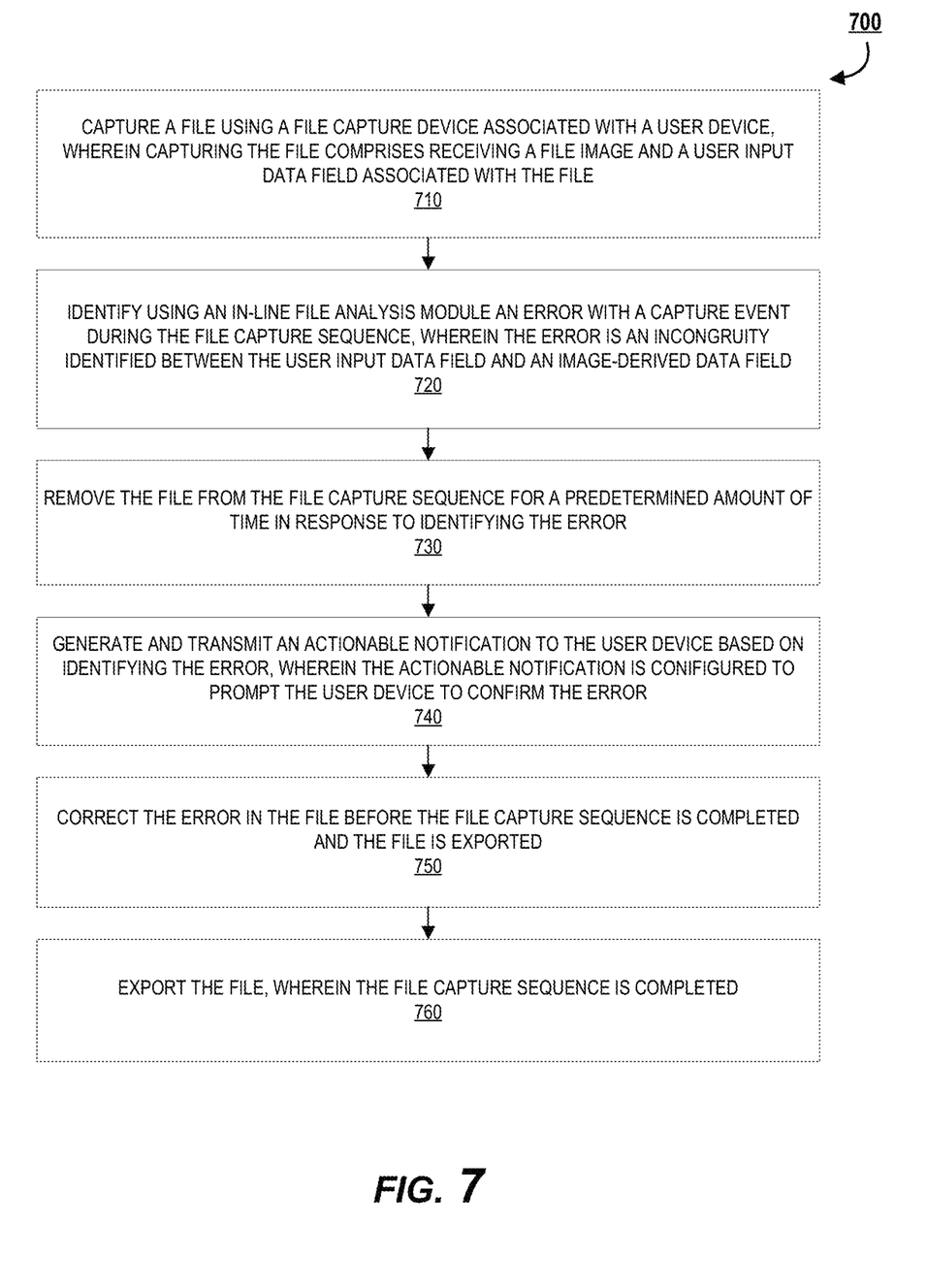
FIG. 7 provides a high level process flow for capturing and processing files, in accordance with one embodiment of the invention.

The processes described herein by the invention utilize the system environments 100 and 600, in various embodiments, to capture, correct, and process files. FIG. 7 provides a high level process flow for capturing and processing files, in accordance with one embodiment of the invention. As illustrated in block 710 of FIG. 7, the system first captures a file using a file capture device associated with a user device. As previously discussed, the system may utilize an image capture device, scanner, or the like, such as camera 216, to capture an image of a file (e.g., a check). In some embodiments, capturing the file further comprises receiving a user input data field associated with the file or other data input by a user on the user device. For example, the user may provide a resource amount associated with a captured file image for confirmation. The system utilizes the provided data to determine potential errors and discrepancies associated with a capture event such as the capturing of an image file. The system includes an optical character recognition (OCR) module configured to determine one or more image-derived data fields from the file. The captured image is analyzed by the system to determine data fields from the file for analysis.

As illustrated in block 720, the system is configured to identify, using an in-line file analysis module (i.e., file analysis module 610), an error with a capture event during the file capture sequence, wherein the error is a mismatch or discrepancy identified between the user input data field and an image-derived data field. In a non-limiting example, the error may be a discrepancy of one or more characters between the user input data field and the image-derived data field. In some embodiments, the user input data field and the image-derive data field are associated with the same data field. For example, as illustrated in FIG. 5, the compared data field may be at least one of the fields 502, 504, 506, and/or 508 on the image file of the check 500 such as a resource amount 502.

As illustrated in block 730, once the errors are identified in a file, the system is configured to remove said file from the file capture sequence for a predetermined period of time in response to identifying the error. In this way, a file having an error may be sequestered from the file processing sequence, and the error-related file will not yet proceed past the file analysis module 610. By instead removing the file temporarily, the file may be corrected in near real-time while the interaction is being finalized instead of being transmitted directly to an analyst discrepancy resolution system 624 for later resolution.

As illustrated in block 740, the system generates and transmits an actionable notification to the user device based on identifying the error. In this way, unlike conventional file processing systems, the system of the invention reinserts the user and user device back into the sequence of events to resolve errors. In some embodiments, the actionable notification is configured to prompt the user device to confirm or reject the identified potential error, i.e., via a notification or alert in a user interface generated on a display of the user device. The user device may transmit a response back to the user interaction system 606 either confirming or rejecting the potential error. If the identified error is rejected, the process may automatically proceed to an analyst system 624 for typical resolution methods.

As illustrated in block 750, if the user confirms the presence of the error, the system is then configured to correct the error in the file before the file capture sequence is completed and the file is fully processed. In some embodiments, correcting the error comprises modifying the file, wherein at least one of the file image and the user input data field is modified by the system. In some embodiments, the system may place a marking, correction, or the like on the image file and/or the file itself to correct the file (e.g., modifying pixels in the image). For example, the system may insert a strike-out through incorrect information or replace the incorrect information with the corrected data.

In some embodiments, correcting the error comprises recapturing the file after identifying the error, wherein an additional image of the file may be captured by the system. In some embodiments, the system may be configured to capture and compare one or more additional images with an original captured image to determine a confidence in the presence of an error above a predetermined threshold (e.g., the error was detected in two of three images captured).

Following correction, the file is reinserted into the sequence of the file capture process. As illustrated in block 760, the system exports the file, wherein the file capture sequence is completed. The file may be exported by the verified file processing and routing system 622 to a destination account or location. In a specific embodiment, the file is a resource vehicle (e.g., a check), wherein exporting the file comprises routing resources associated with the resource vehicle to a resource storage location As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with file capture, processing, and error correction.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for file capture and processing, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for file capture and in-line error correction, the computer-implemented method comprising:

monitoring, using a processing device and in real-time, a data flow over a network from a user device to a system maintained and operated by a financial institution, wherein the system conducts financial transactions by processing files received via the data flow in a processing stream;

identifying, using the processing device and in the data flow, a file comprising (i) an image of a physical document captured, during a file capture sequence, using a camera of the user device and (ii) user input data fields associated with the physical document input, during the file capture sequence, to a user interface of the user device;

intercepting, using the processing device, from the data flow, and before the file is routed to the system, the file;

analyzing, while the file is at the processing device and before the file is routed to the system, the image to determine image-derived data fields from the physical document;

comparing, while the file is at the processing device and before the file is routed to the system, the user input data fields to the image-derived data fields;

identifying, while the file is at the processing device, before the file is routed to the system, and based on comparing the user input data fields to the image-derived data fields, an error comprising a discrepancy between a user input data field of the user input data fields and an image-derived data field of the image-derived data fields;

generating, while the file is at the processing device, before the file is routed to the system, and based on identifying the error, an actionable notification comprising the user input data field and the image-derived data field determined by the processing device while analyzing the image;

transmitting, while the file is at the processing device, before the file is routed to the system, and to the user device, the actionable notification, wherein the actionable notification is configured to prompt the user device to display, via the user interface, the actionable notification comprising the user input data field and the image-derived data field determined by the processing device while analyzing the image;

receiving, while the file is at the processing device, before the file is routed to the system, and from the user device, a response comprising a confirmation of the error;

in response to receiving the response-comprising the confirmation of the error:

correcting, while the file is at the processing device and before the file is routed to the system, the error in the file by either (i) modifying pixels in the image of the physical document to strike-through incorrect information and replacing the incorrect information with the user input data field or (ii) modifying, in the file, the user input data field to strike-through incorrect information and replacing the incorrect information with the image-derived data field determined by the processing device while analyzing the image; and exporting the file to the processing stream of the system to complete the file capture sequence and initiate a financial transaction conducted by the system using the file.

2. The computer-implemented method of claim 1, comprising removing the file from the file capture sequence for a predetermined amount of time in response to identifying the error.

3. The computer-implemented method of claim 1, comprising transmitting the file to an analyst discrepancy resolution system after a predetermined amount of time without receiving the response from the user device.

4. The computer-implemented method of claim 1, comprising, when analyzing the image to determine the image-derived data fields from the physical document, determining, using an optical character recognition module, the image-derived data fields, and wherein the discrepancy comprises a mismatch of one or more characters between the user input data field and the image-derived data field.

5. The computer-implemented method of claim 1, comprising, when correcting the error, capturing, using the camera of the user device, another image of the physical document after identifying the error.

6. The computer-implemented method of claim 1, wherein the user input data field and the image-derived data field are associated with a same data field.

7. A computer program product for file capture and in-line error correction, wherein the computer program product comprises a non-transitory computer-readable medium comprising computer-readable instructions, the computer-readable instructions, when executed by a processing device, cause the processing device to:

monitor, in real-time, a data flow over a network from a user device to a system maintained and operated by a financial institution, wherein the system conducts financial transactions by processing files received via the data flow in a processing stream;

identify, in the data flow, a file comprising (i) an image of a physical document captured, during a file capture sequence, using a camera of the user device and (ii)

user input data fields associated with the physical document input, during the file capture sequence, to a user interface of the user device;

intercept, from the data flow and before the file is routed to the system, the file;

analyze, while the file is at the processing device and before the file is routed to the system, the image to determine image-derived data fields from the physical document;

compare, while the file is at the processing device and before the file is routed to the system, the user input data fields to the image-derived data fields;

identify, while the file is at the processing device, before the file is routed to the system, and based on comparing the user input data fields to the image-derived data fields, an error comprising a discrepancy between a user input data field of the user input data fields and an image-derived data field of the image-derived data fields;

generate, while the file is at the processing device, before the file is routed to the system, and based on identifying the error, an actionable notification comprising the user input data field and the image-derived data field determined by the processing device while analyzing the image;

transmit, while the file is at the processing device, before the file is routed to the system, and to the user device, the actionable notification, wherein the actionable notification is configured to prompt the user device to display, via the user interface, the actionable notification comprising the user input data field and the image-derived data field determined by the processing device while analyzing the image;

receive, while the file is at the processing device, before the file is routed to the system, and from the user device, a response comprising either a confirmation or a rejection of the error;

in response to the response comprising the confirmation of the error:

correct, while the file is at the processing device and before the file is routed to the system, based on the response, and using either the user input data field or the image-derived data field, the error in the file by either (i) modifying pixels in the image of the physical document to strike-through incorrect information and replacing the incorrect information with the user input data field or (ii) modifying, in the file, the user input data field to strike-through incorrect information and replacing the incorrect information with the image-derived data field determined by the processing device while analyzing the image;

export the file to the system to complete the file capture sequence and initiate a financial transaction conducted by the system using the file; and in response to the response comprising the rejection of the error, export the file to an analyst discrepancy resolution system to complete the file capture sequence.

8. The computer program product of claim 7, wherein the computer-readable instructions, when executed by the processing device, further cause the processing device to remove the file from the file capture sequence for a predetermined amount of time in response to identifying the error.

9. The computer program product of claim 7, wherein the computer-readable instructions, when executed by the processing device, cause the processing device to transmit the file to the analyst discrepancy resolution system after a predetermined amount of time without receiving the response from the user device.

10. The computer program product of claim 7, wherein the computer-readable instructions, when executed by the processing device, cause the processing device to, when analyzing the image to determine the image-derived data fields from the physical document, determine, using an optical character recognition module, the image-derived data fields, and wherein the discrepancy comprises a mismatch of one or more characters between the user input data field and the image-derived data field.

11. The computer program product of claim 7, wherein the computer-readable instructions, when executed by the processing device, cause the processing device to, when correcting the error, capture, using the camera of the user device, another image of the physical document after identifying the error.

12. The computer program product of claim 7, wherein the user input data field and the image-derived data field are associated with a same data field.

13. A system for file capture and in-line error correction, the system comprising:

a memory device with computer-readable program code stored thereon:

a communication device connected to a network; and a processing device, wherein the processing device is configured to execute the computer-readable program code to:

monitor, in real-time, a data flow over the network from a user device to an entity system maintained and operated by a financial institution, wherein the entity system conducts financial transactions by processing files received via the data flow in a processing stream;

identify, in the data flow, a file comprising (i) an image of a physical document captured, during a file capture sequence, using a camera of the user device and (ii) user input data fields associated with the physical document input, during the file capture sequence, to a user interface of the user device;

intercept, from the data flow and before the file is routed to the entity system, the file;

analyze, while the file is at the processing device and before the file is routed to the entity system, the image to determine image-derived data fields from the physical document;

compare, while the file is at the processing device and before the file is routed to the entity system, the user input data fields to the image-derived data fields;

identify, while the file is at the processing device, before the file is routed to the entity system, and based on comparing the user input data fields to the image-derived data fields, an error comprising a discrepancy between a user input data field of the user input data fields and an image-derived data field of the image-derived data fields;

generate, while the file is at the processing device, before the file is routed to the entity system, and based on identifying the error, an actionable notification comprising the user input data field and the image-derived data field determined by the processing device while analyzing the image;

transmit, while the file is at the processing device, before the file is routed to the entity system, and to the user device, the actionable notification, wherein the actionable notification is configured to prompt the user device to display, via the user interface, the actionable notification comprising the user input data field and the image-derived data field determined by the processing device while analyzing the image;

receive, while the file is at the processing device, before the file is routed to the entity system, and from the user device, a response comprising either a confirmation or a rejection of the error;

in response to the response comprising the confirmation of the error:
- correct, while the file is at the processing, device and before the file is routed to the entity system, response, and using either the user input data field or the image derived data field, the error in the file by either (i) modifying pixels in the image of the physical document to strike-through incorrect information and replacing the incorrect information with the user input data field or (ii) modifying, in the file, the user input data field to strike-through incorrect information and replacing the incorrect information with the image-derived data field determined by the processing device while analyzing the image;
- export the file to the processing stream of the entity system to complete the file capture sequence and initiate a financial transaction conducted by the system using the file; and in response to the response comprising the rejection of the error, export the file to an analyst discrepancy resolution system to complete the file capture sequence.

14. The system of claim 13, wherein the processing device is further configured to execute the computer-readable program code to remove the file from the file capture sequence for a predetermined amount of time in response to identifying the error.

15. The system of claim 13, wherein the processing device is further configured to execute the computer-readable program code to transmit the file to the analyst discrepancy resolution system after a predetermined amount of time without receiving the response from the user device.

16. The system of claim 13, wherein the processing device is configured to execute the computer-readable program code to, when analyzing the image to determine the image-derived data fields from the physical document, determine, using an optical character recognition module, the image-derived data fields, and wherein the discrepancy comprises a mismatch of one or more characters between the user input data field and the image-derived data field.

17. The system of claim 13, wherein the user input data field and the image-derived data field are associated with a same data field.

18. The system of claim 13, wherein the processing device is configured to execute the computer-readable program code to, when correcting the error, capture, using the camera of the user device, another image of the physical document after identifying the error.

19. The system of claim 13, wherein the processing device is configured to execute the computer-readable program code to, when exporting the file, route resources associated with the physical document to a resource storage location.

* * * * *